US005359766A

United States Patent [19]

Pavely et al.

[11] Patent Number: 5,359,766

[45] Date of Patent: Nov. 1, 1994

[54] CONTAINERS

[75] Inventors: Andrew P. Pavely, Lower Blunsdon; Roy J. Marr, Newbury; Peter S. Foskett; David M. White, both of Abingdon, all of United Kingdom

[73] Assignee: CarnaudMetalbox plc, United Kingdom

[21] Appl. No.: 995,017

[22] Filed: Dec. 22, 1992

Related U.S. Application Data

[62] Division of Ser. No. 781,693, Oct. 23, 1991, Pat. No. 5,191,695.

[30] Foreign Application Priority Data

Oct. 25, 1990 [GB] United Kingdom ................. 9023243

[51] Int. Cl.5 ............................................. B23P 19/00

[52] U.S. Cl. .................................... 29/564.6; 29/788; 29/796

[58] Field of Search .................... 29/33 R, 564.6, 818, 29/788, 796, 564.1, 451, 521; 40/307; 206/459.5, 459.1; 220/269, 270

[56] References Cited

U.S. PATENT DOCUMENTS

| | | | |
|---|---|---|---|
| 3,097,423 | 7/1963 | Makowski | 29/508 X |
| 3,822,496 | 7/1974 | Minder | 40/307 |
| 3,958,354 | 5/1976 | Hough et al. | 40/307 |
| 4,322,016 | 3/1982 | Barrash | 40/307 X |
| 4,380,129 | 4/1983 | Barrash | 40/307 |
| 4,685,849 | 8/1987 | LaBarge et al. | 29/522.1 |
| 4,804,105 | 2/1989 | Zysset | 220/273 |

FOREIGN PATENT DOCUMENTS 0080775 11/1982 European Pat. Off. .

OTHER PUBLICATIONS

EP 91 30 8977 European Search Report dated Jan. 29, 1992.

Appln. No. 9120823.1 Examiner's Report to the Comptroller of Jan. 28, 1992.

*Primary Examiner*—William Briggs

*Attorney, Agent, or Firm*—Diller, Ramik & Wight

[57] ABSTRACT

A can end (1) having an openable portion (14) defined by a score line (13), has a ring pull defining an aperture in which is retained a token (16) which may be removed as proof of purchase to qualify the purchaser for a prize or other premium offer. The token (16) is preferably made from a plastics material which is retained by clinching of peripheral material of the ring pull, and may be marked with indicia.

4 Claims, 11 Drawing Sheets

Fig.14a

CONTAINERS

This application is a division of application Ser. No. 07/781,693, filed Oct. 23, 1991, U.S. Pat. No. 5,191,695.

This invention relates to tokens, attached to an article of packaging, which may be used as proof of purchase of the article or for other purpose. More particularly, but not exclusively, the invention relates to a proof of purchase token attached to the lever used to open cans commonly used to contain beverages or other products, a method of fixing a token to a pull ring, and apparatus for carrying out the method.

Pull ring can ends having a printed underside for gaming purposes were used in America until legislation in certain States banned the use of completely detachable ring pulls because the torn edge were perceived to be dangerous litter. U.S. Pat. No. 4,459,910 (Metal Box Can/Taube) describes an embossing press used to incise numbers on the underside of the ring pull of a beverage can end, the intention being that certain numbers would qualify the purchaser to claim a prize.

British Patent 1540229 (Reynolds Metals Co/Cudzik) describes a can end for beverage cans in which a lever attached to the can end at a hinge plate portion is used to push an openable flap down in to the can and remain captive on the can end. These can ends are shown in FIGS. 1 and 2 of the drawing now widely used but, because the lever is captive on the can end, it cannot be removed for sales promotion and gaming purposes.

The sales promotion games and prizes were much enjoyed and provided a useful encouragement of trade and reward for loyalty to a particluar brand of product.

U.S. Pat. No. 3,958,354 (Robert J Hough/BOISE CASCADE CORPORATION) describes a promotional token for attachment to the pull tab ring of an easy-open container. The token is preferably made of a synthetic plastics material to include a mounting portion, adapted for insertion in the finger opening of the ring, and connecting means for removably fastening the token mounting portion in the finger opening of the ring. The token mounting means described by HOUGH are:

- a continuous groove contained in the outer peripheral wall surface of the mounting portion to achieve a snap-fit in the finger opening (FIGS. 1, 2, 3); or lateral wing portions that extent outwardly from the mounting portion across the adjacent portions of the pull ring to achieve a snap fit (FIGS. 4, 5 and 6, 7); or
- a plurality of resilient lug means circumferentially spaced about the periphery of a body portion of the token having an outer peripheral configuration that corresponds generally with the inner periphery of the finger opening so that the outer pheripheral surface of the token is a snap fit in the inner peripheral surface of the pull ring.

In all the embodiments described in U.S. Pat. No. 3,958,354 the token is retained in the pull tab ring by snap fit of the token in the finger opening so that problems may arise from dimensional variations arising, during injection moulding of the resilient token material, which may spoil the snap-fit attachment to render the token too easy to remove. We believe that the most convenient time to fit a token onto a pull tab ring is before the pull ring is fitted onto the can end while the token receiving surfaces of the pull ring are accessible. However, the token must be firmly and reliably retained in the pull ring to prevent any risk of a token falling from the ring pull to cause a crash in the press which rivets the pull ring to the can end. We believe that reliable retention of the token in the pull ring is best achieved by clinching of a lateral tab of the token in the peripheral curl of the pull ring.

In a first aspect this invention provides a token removably retained in engagement with a ring pull or lever adapted for attachment to a container wall characterised in that the token is retained in engagement with the pull ring or lever by a peripheral curl portion of the lever material. Benefits arising from peripheral grip on the token include secure retention of the token during subsequent assembly of the pull ring to a can end.

In one embodiment the token has at least one lug extending laterally from the body of the token, and the lug is retained in engagement with the pull ring or lever by a peripheral curl portion clinched onto the lug. The benefit of clinching upon a lug resides in the localised grip which permits removal of the token from the pull ring after opening of a can.

The token may be made of a plastics material, such as polyethylene or polypropylene or metal strip. Each of these materials is amendable to different forming techniques to make the token shapes, but in all cases the tokens are fixed to the lever by clinching.

The token may be an injection moulding of plastics material. Alternatively, the token shape may be cut from an elongate extruded section of plastics strip, metal strip or laminate to define a token which preferably has at least one lug extending laterally from the body.

After the token has been retained on the ring pull or lever the ring pull or lever is attached to a wall of a container, usually by staking a rivet such as is used on can ends. The token may have indicia marked on the underside facing the wall of the container to permit playing of games of chance.

Retention of the token in the lever or ring pull maybe increased by a pair of axially aligned lugs, each of which extends away from the body of the token for retention by a peripheral curl portion at a side of the lever or pull ring, but care must be taken to avoid making the token irremovable.

The body of the token is preferably of a shape to fit loosely inside an aperture of the lever or pull ring and present an upper token surface to the user who can then remove the token from the lever or ring pull by pressing on the upper surface.

In a second aspect the invention provides a method of retaining a proof of purchase token in a ring pull or lever, said method being characterised by the steps of feeding a strip of material including token portions to a parting station; applying pressure to the strip to part a token from the strip and apply the parted token to the lever or ring pull; and clinching a peripheral portion of the material of the lever or ring pull into engagement with the token. The benefit of this method is that the token and receiving surface of the lever or ring pull is automatically aligned to ensure correct fitting.

The strip of material including token portions may be formed by casting moulding thermoplastics material to comprise a pair of elongate members joined by a plurality of moulded tokens.

Each token of the strip may be decorated, before parting from the strip by a process chosen from surface relieve formed during moulding, or embossing after moulding, or hot die stamping, or ink jet printing.

In an alternative method, the strip of material including token portions is formed by extrusion of a single thermoplastic polymer, or as coextrusion of said thermoplastic polymer and a second polymer to make a two layer strip, or by extrusion coating a metal strip, or by lamination of a polymer to a metal strip.

Again, indicia may be marked on the strip before each token is parted from the strip.

In a preferred method extruded strip is formed to comprise a central web and an offset flange margin extending laterally from each side of the central web.

The token is parted from the extruded strip by cooperation of a die and a punch which is applied to the strip to first cut out a token and then apply the token to a part formed lever or ring pull, so that a single movement of the punch not only parts the token from the strip but also applies it correctly to the lever or ring pull.

The punch and die preferably cooperate to cut out a token having a body cut from the central web of the extruded strip and at least one lug extending laterally from the token body in a plane offset from the plane of the body after which step a peripheral portion of the lever or ring pull is curled to clinch against a peripheral portions or lug of the token so that the central web portion is held up in an aperture in the lever or ring pull. The lever ring pull with token attached, may be passed to a rivetting station at which the lever or pull rings is retained on a can end by staking of a rivet.

In a further aspect this invention provides apparatus for retaining a proof of purchase token on a lever or ring pull, said apparatus comprising, (a) means to feed a strip of material including token portions to a parting station;
(b) a parting station at which the token portion is severed from the strip of material;
(c) means to transfer the parted token to a location in a partly formed lever or ring pull; and
(d) means to clinch a peripheral portion of the lever into clinched engagement with a peripheral portion of the token.

In one embodiment of the apparatus the means to part the token portion from the strip is a punch and die so arranged that after parting the token from the strip the punch pushes the token through die and into engagement with the partly formed lever or ring pull.

In a preferred embodiment, the apparatus further comprises means to convey the lever or ring pull with token attached, to a station at which the pull ring is rivetted to a can end.

The means to feed the strip of token material to the parting station also includes means to apply indicia to the strip. Suitable means to apply indicia to the strip include an embossing press tool, hot die stamping tool, or a printing head such as an ink jet printer. When making tokens for gaming or lotteries, the means to apply indicia, marks one of a range of indicia on each token.

The extruded section may be marked with indicia before cropping out the token.

Various embodiments will now be described by way of example and with reference to the accompanying drawings in which.

Figure 12:
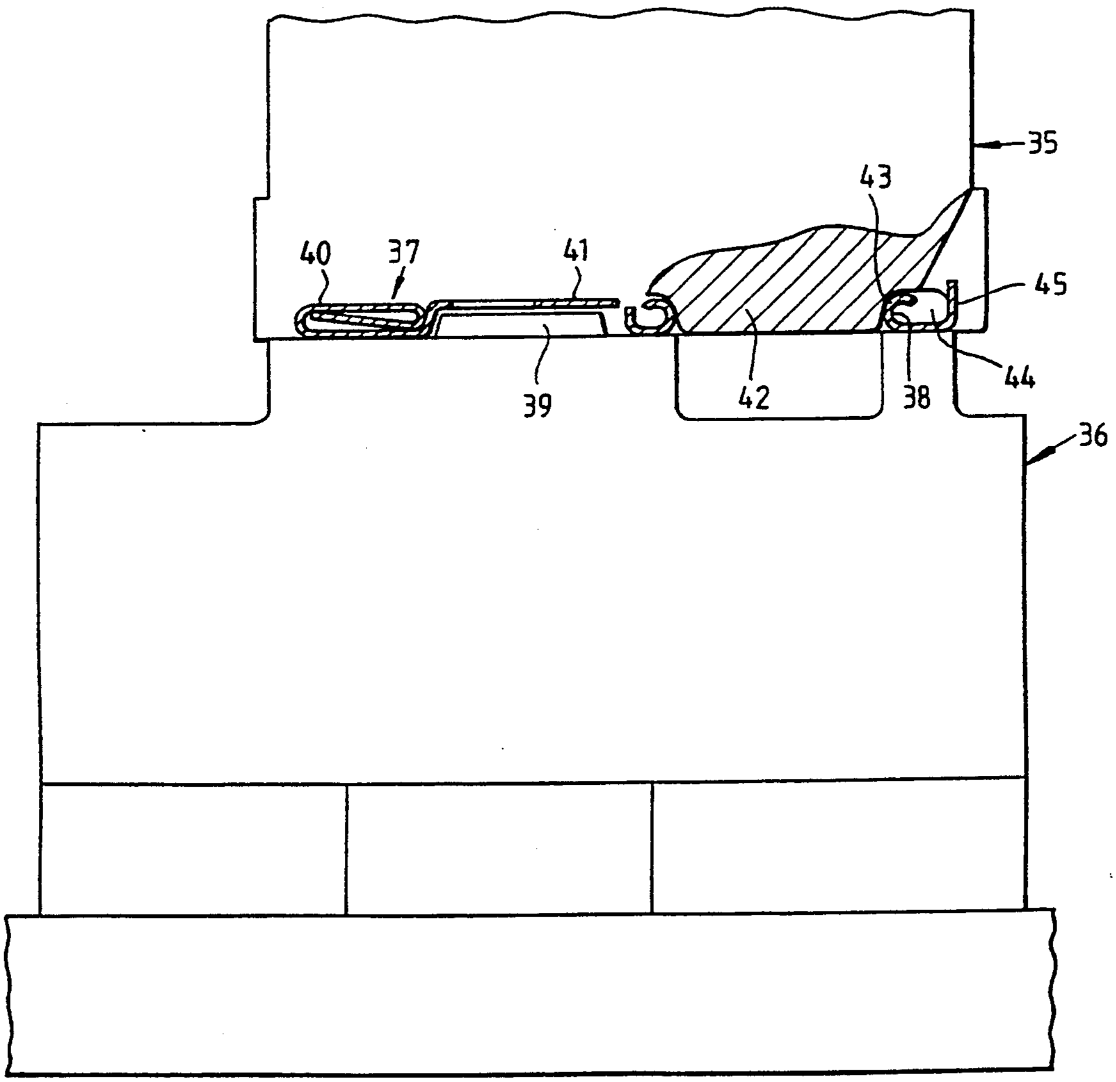
FIG. 12 is a part sectioned side view of a curling station and pull ring.
Figure 12A:
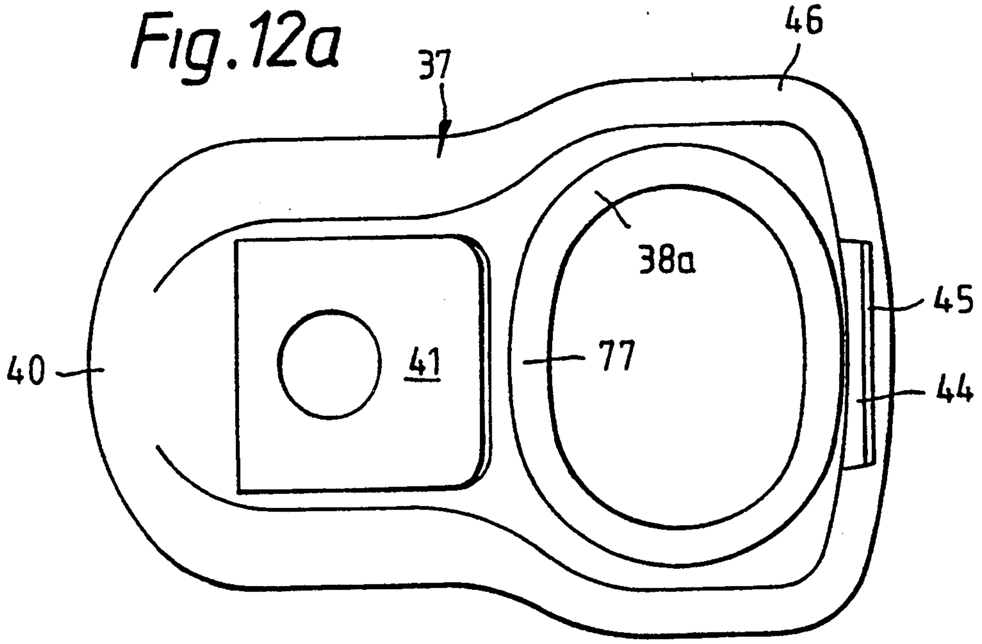
Figure 13C:
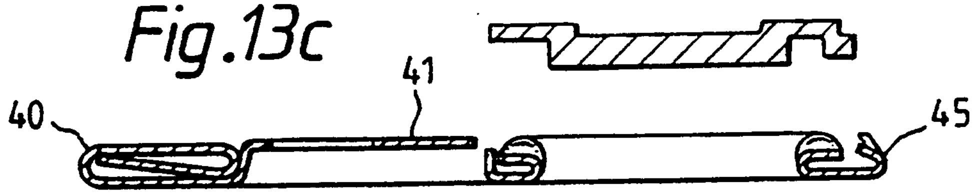
Figure 13A:
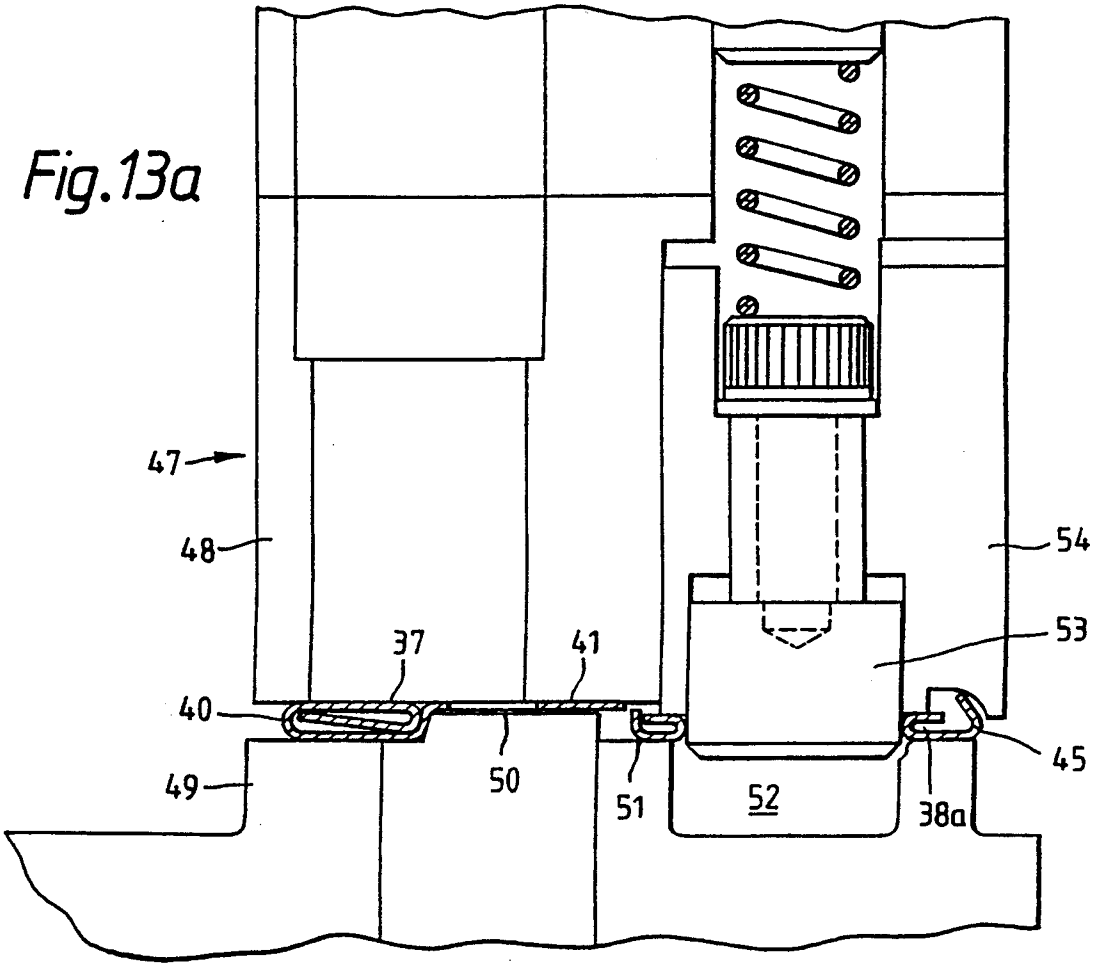
Figure 13B:
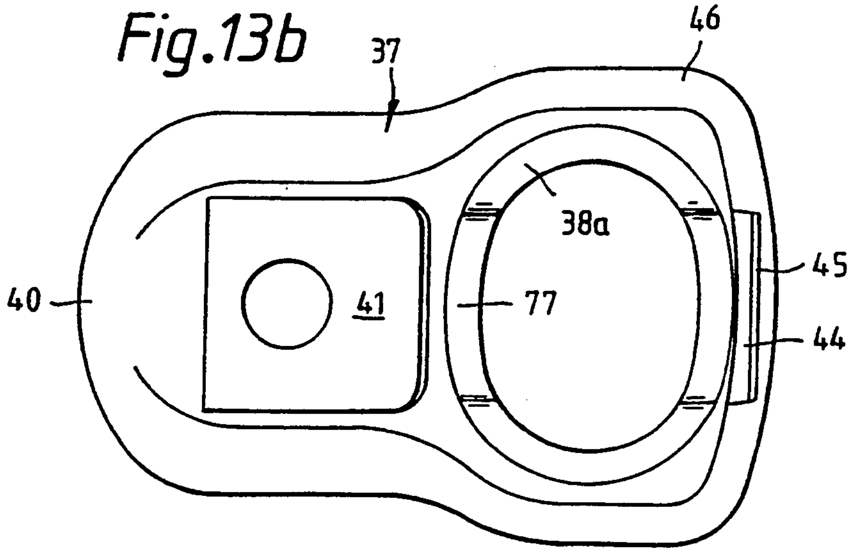
Figure 14A:
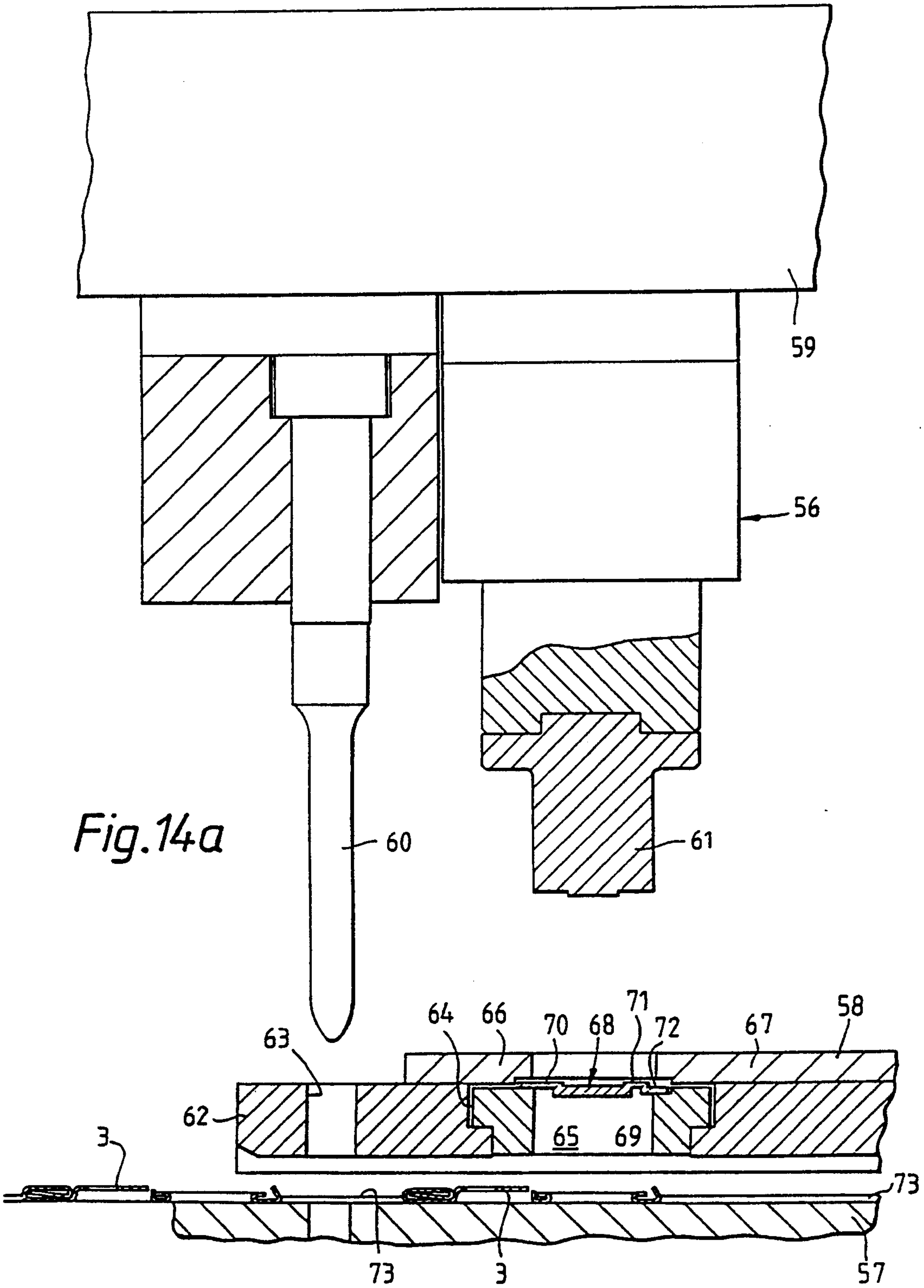
Figure 14B:
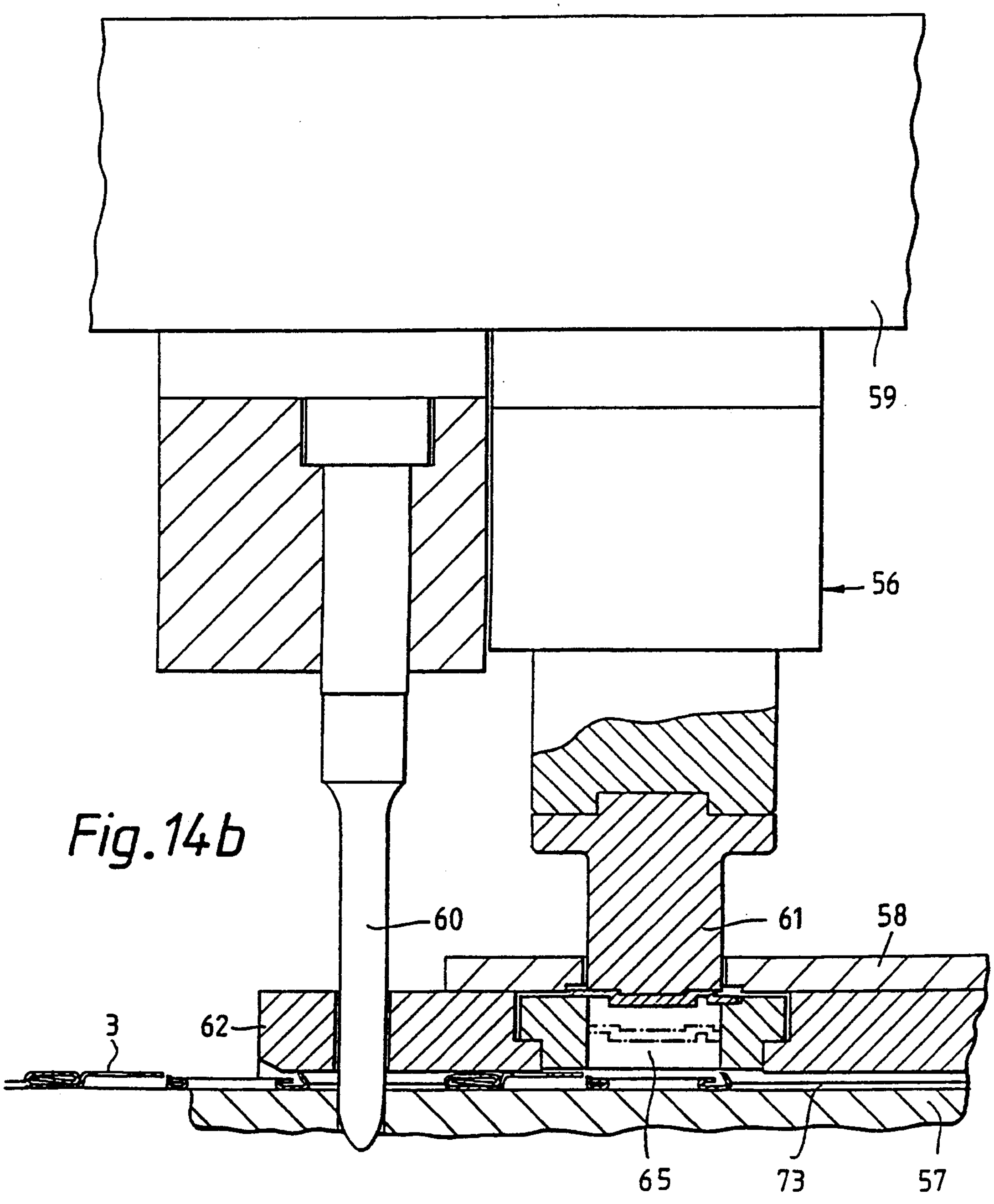
Figure 14C:
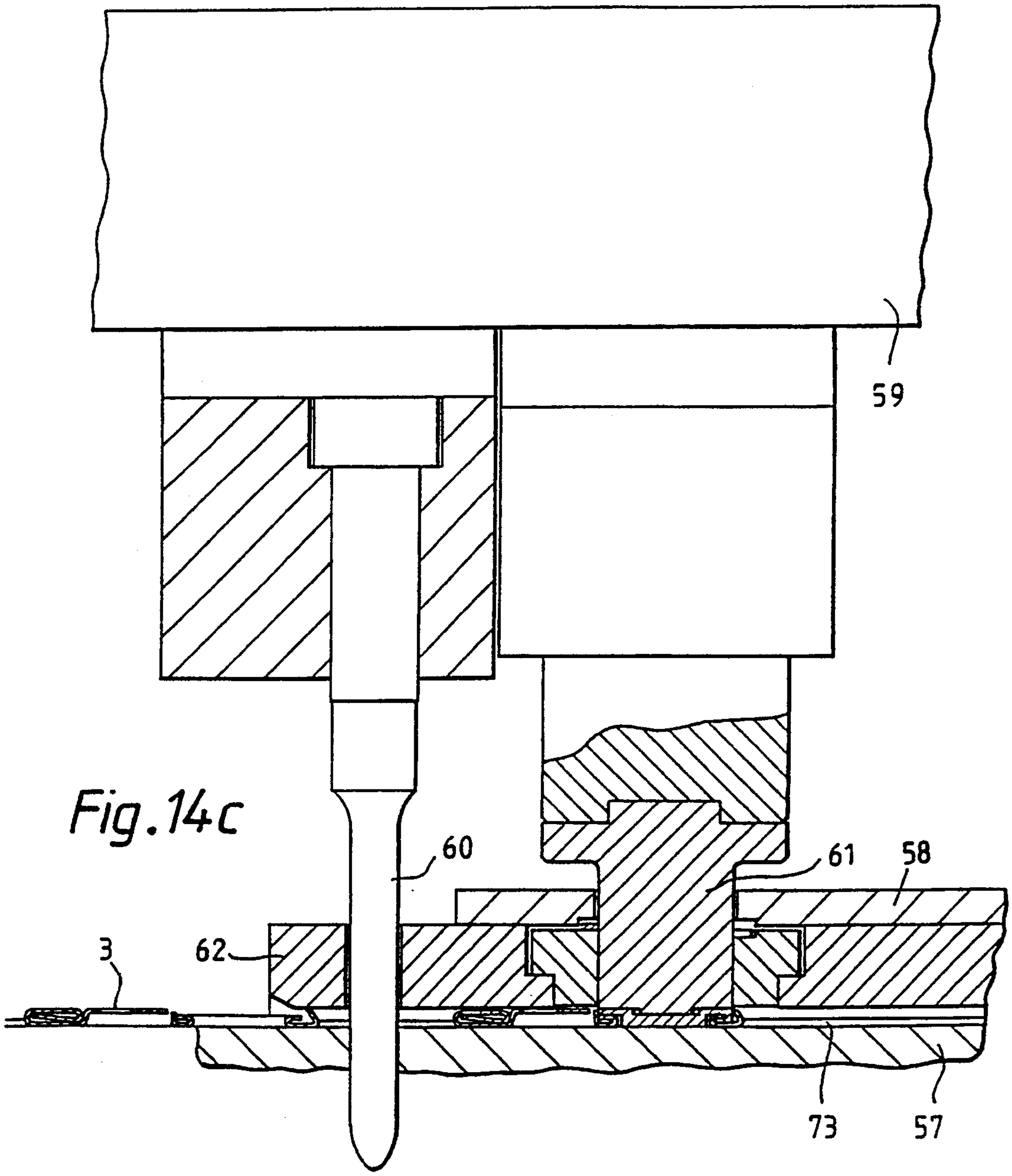
Figure 15:
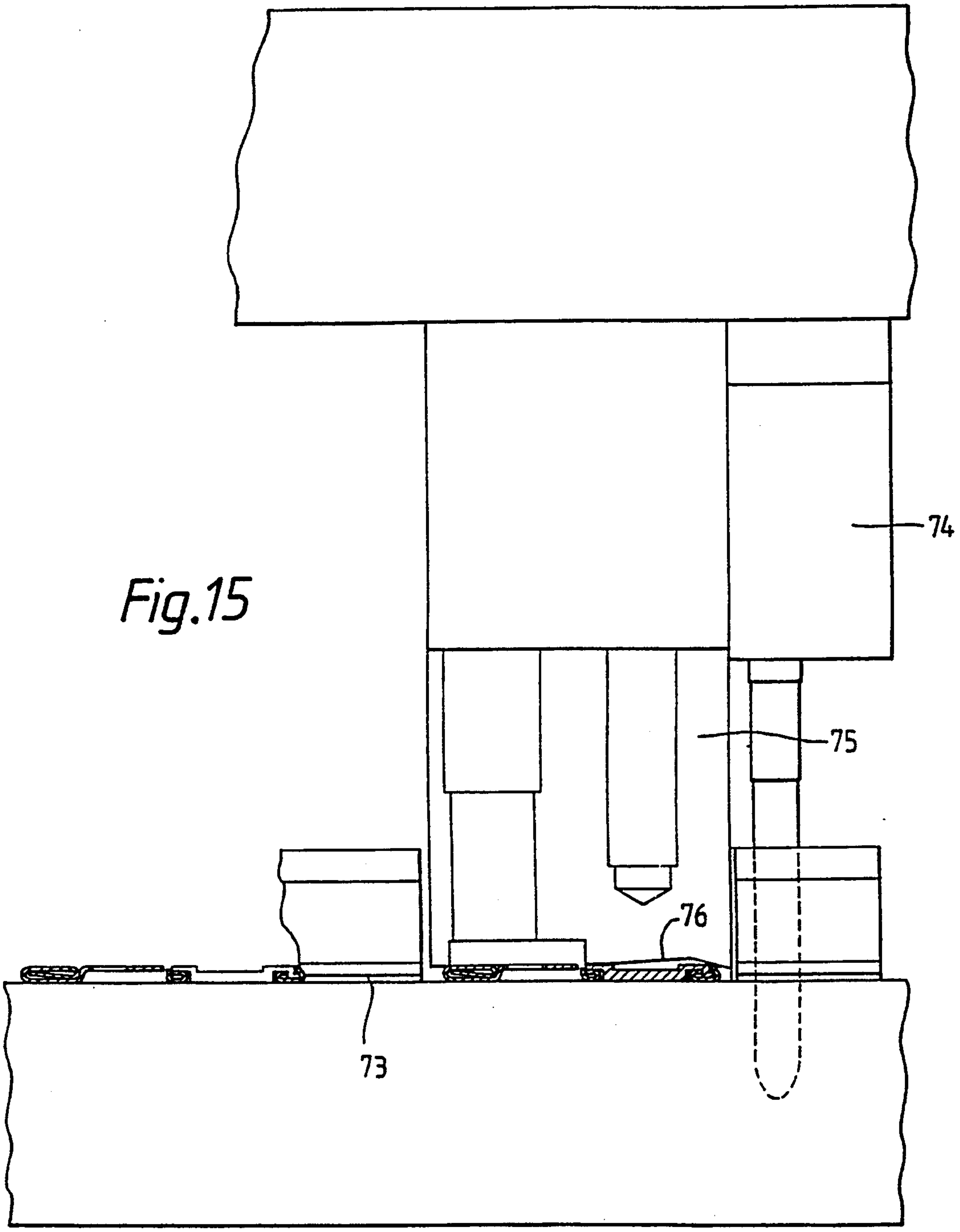
Figure 16:
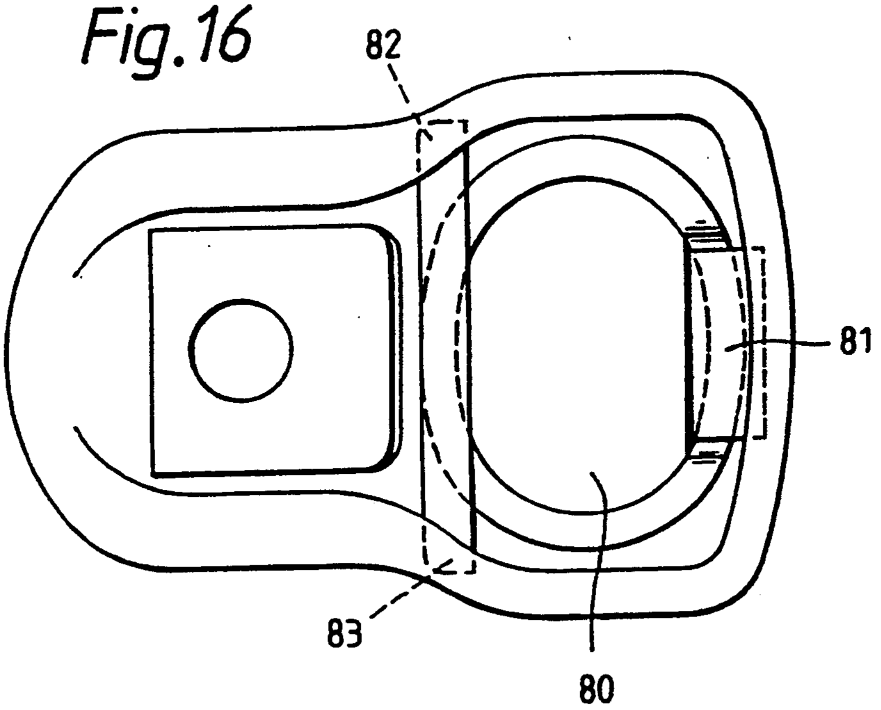
Figure 17:
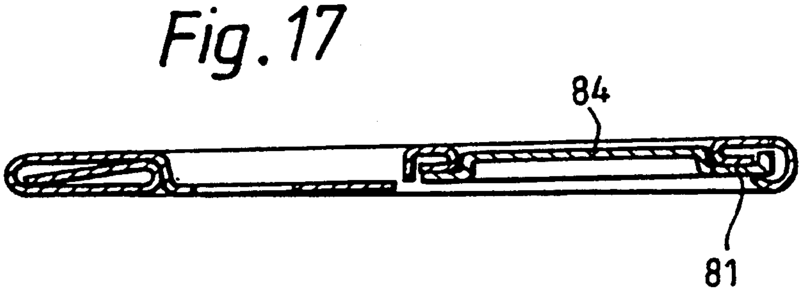
Figure 18:
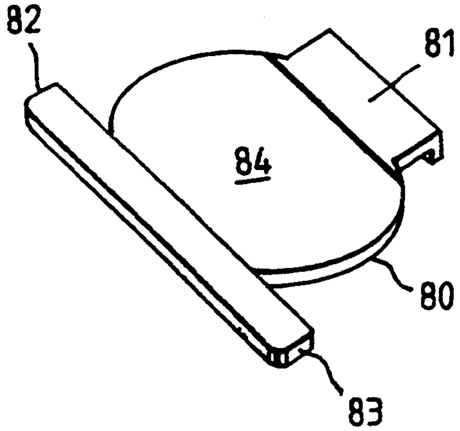
Figure 19:
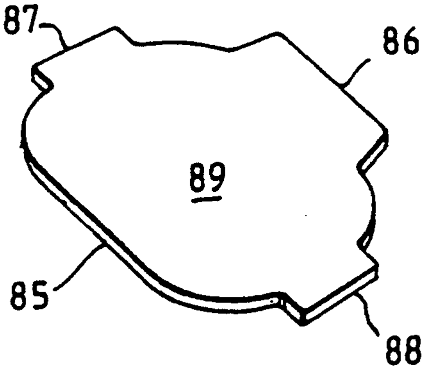

FIG. 12*a* is a plan view of a pull ring after curling;

FIG. 13*a* is a side view of a curl flattening station;

FIGS. 13*b* and 13*c* are a plan view and sectioned side view of pull ring after flattening of the curl;

FIGS. 14*a*, 14*b* and 14*c* are side views of a token punching and fitting station at various positions in operation;

FIG. 15 is a side view of a clinching station;

FIG. 16 is a plan view of an alternative token and pull ring;

FIG. 17 is a side view of a pull ring and token sectioned on a centre line in FIG. 16;

FIG. 18 is a perspective sketch of the alternative token of FIGS. 16 and 17; and FIG. 19 is a perspective sketch of a modified token.

Figure 1:
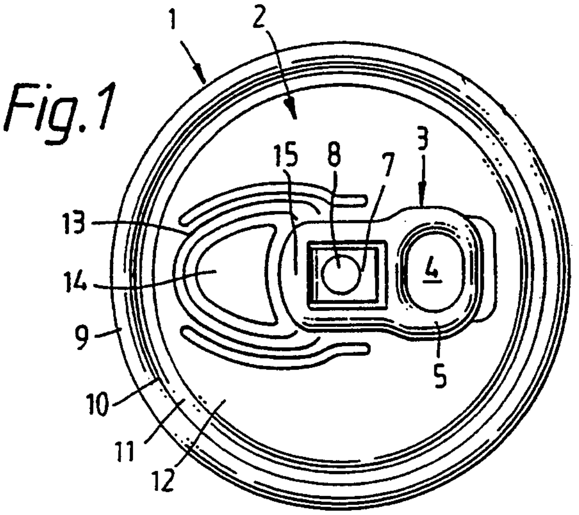
FIG. 1 is a plan view of a prior art can end.
Figure 2:
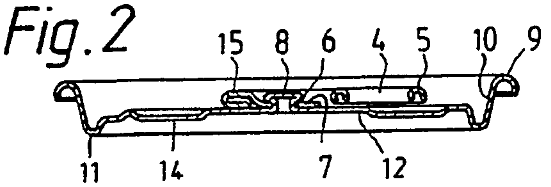
FIG. 2 is a side view of the prior art can end of FIG. 1 sectioned on a diameter through the lever.

FIGS. 1 and 2 show, by way of example, a can end of a kind described in GB 1540229 (REYNOLDS), to which the reader is directed for a detailed description.

In FIGS. 1 and 2 it will be seen that the can end 1 comprises a can end component 2 and a lever 3 which has a large aperture 4 at the right hand end defined by a ring of lever metal 5.

A smaller aperture 6, defined by a square hinge plate 7 of the lever, has permitted entering of a hollow rivet 8 into the smaller aperture and staking to fix the lever 3 on the can end component 2.

The can end component 2 comprises a peripheral flange 9 or cover hook, a chuck wall 10 dependent from the interior of the cover hook, a channel shaped reinforcing bead 11 extending inwards from the chuck wall to support a central panel 12. The rivet 8 is raised from the material of the central panel 12.

A score line 13 defines an approximately "U" shaped openable portion 14 which extends under the nose 15 of the lever but does not encompass the rivet 8.

Figure 8:
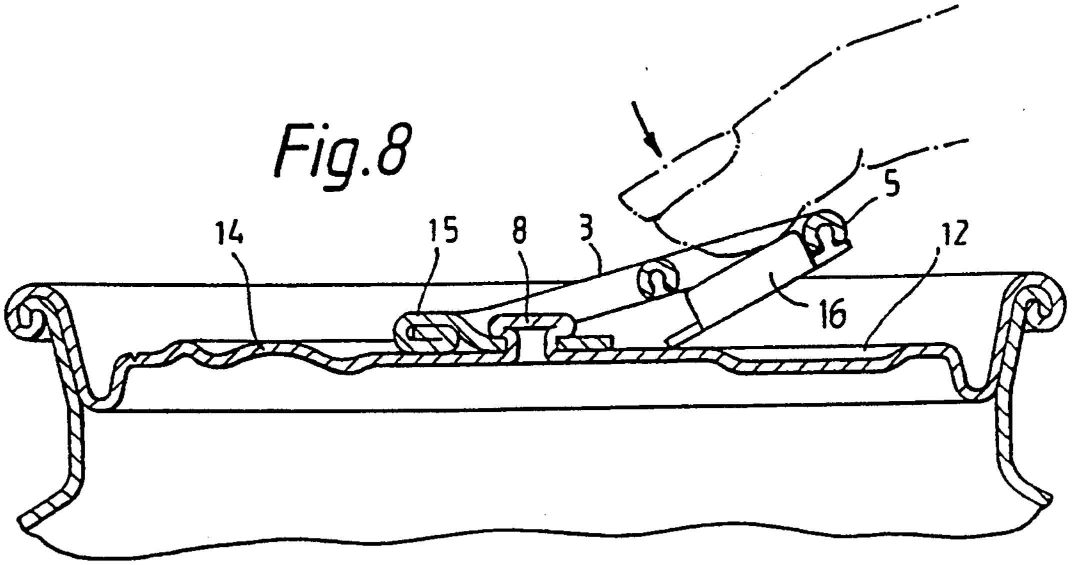
FIG. 8 is a sectioned side view of a can during opening.
Figure 9:
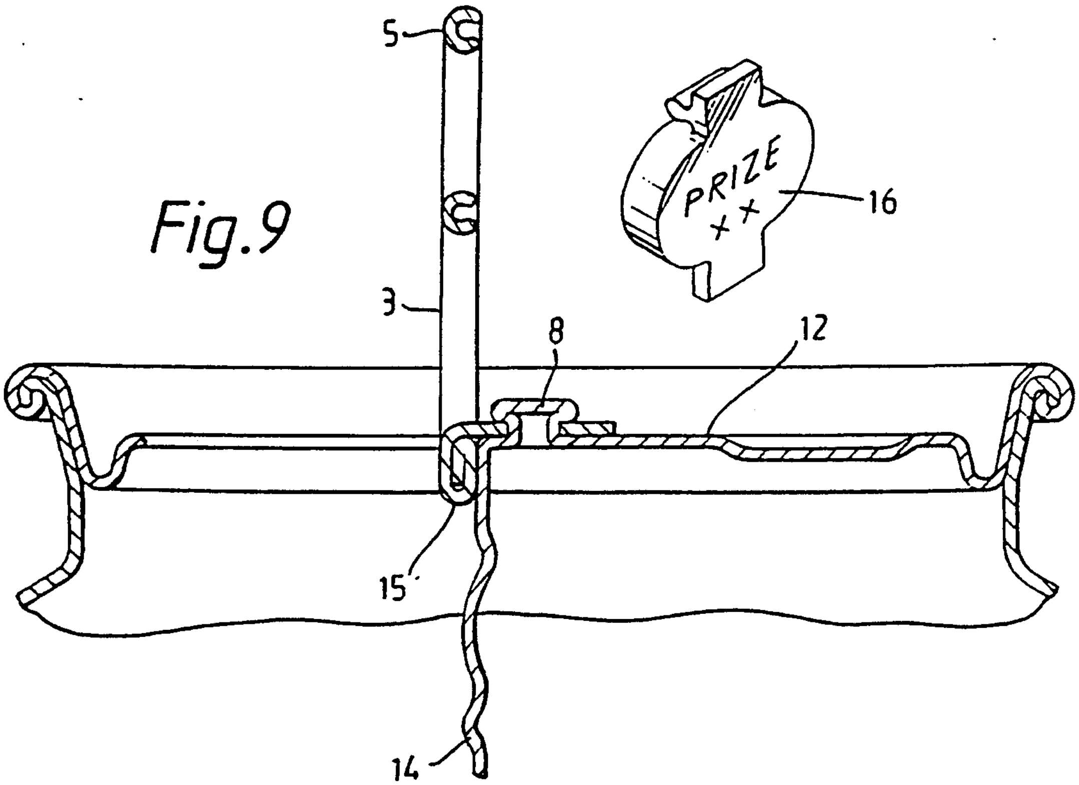
FIG. 9 is a sectioned side view of the can of FIG. 8 after fully opening and removal of the token.

When the ring pull end 5 of the lever is raised about the rivet 8 the hinge plate 7 flexes to permit the nose 15 of the lever to break the score line and progressively open the openable portion 14 as shown in FIGS. 8 and 9.

Figure 3:
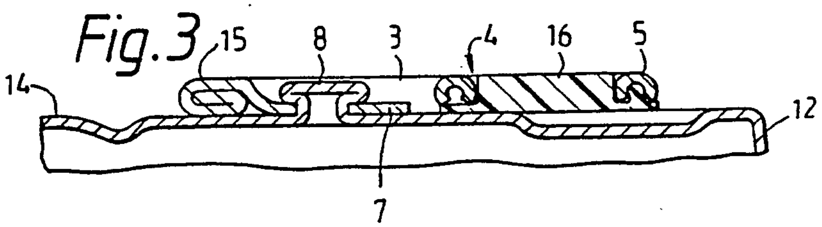
FIG. 3 is an enlarged fragmentary section including a token according to this invention.

In FIG. 3 like parts are denoted by the same numbers as used in FIGS. 1 and 2. In FIG. 3 it will be seen that the large aperture 4 is substantially filled by a token 16 which is retained in position by a crimped portion of the curled ring 5. FIG. 8 shows a lifted tab; the nose has not moved enough to initiate the breaking of the score.

Figure 4:
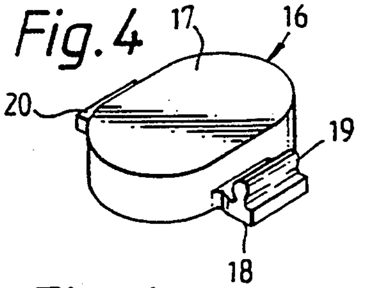
FIGS. 4 and 5 are perspective views of the underside and topside of the token of FIG. 3.
Figure 5:
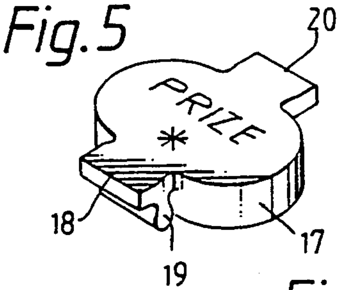

In FIGS. 4 and 5 the token 16 can be seen to comprise a body 17 having a profile to fit in the aperture 4, a first lateral lug 18 having a bulb ended rib portion 19, and a second lateral lug 20 which is flat and diametrically opposed to the first lug. The bulb ended rib 19 is gripped by the curl 5 which permits removal or tearing free of the token at after opening of the can.

FIG. 5 shows that the underside of the token, as presented to the central panel 12 of the can end, has indicia to indicate which prize a purchaser has won in a gaming scheme. If the premium offer scheme simply requires the purchaser to provide a number of tokens as proof of purchase, no indicia are needed on this underside of the token. However it may be prudent to mark one or other side of the token with a mark unique to the proprietor of the beverage bought in case two traders run similiar schemes simultaneously.

Figure 6:
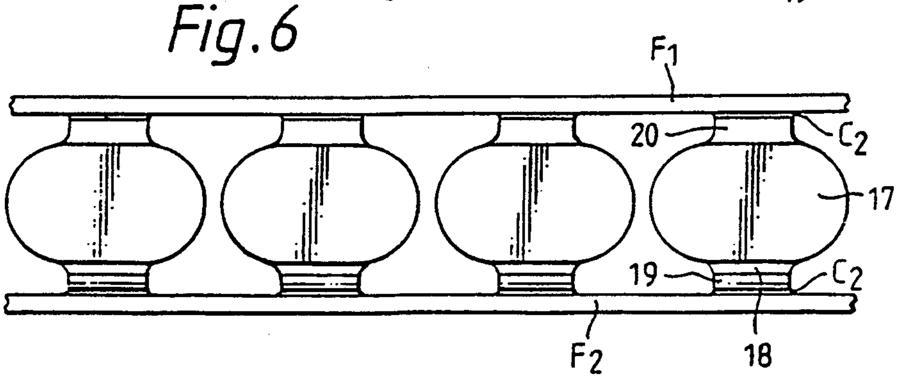
FIG. 6 is a plan view of a length of moulded strip plastics material showing partly cropped tokens.

FIG. 6 shows that the token 16 may be moulded as a plurality of like tokens each connected to the next by a pair of parallel rods or feeders $F_1$, $F_2$. The array of tokens and feeders behaves as a strip for feeding to a parting apparatus.

Figure 7:
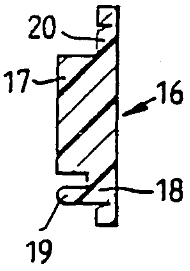
FIG. 7 is an end view of the moulded material of FIG. 6. sectioned through a token.

FIG. 7 shows that each token has a central body 17 flanked by a first lug 18 and a rib 19 to one side and second lug 20 to the other side.

If required the body material 17 of each token may be marked before the token shape is cut from the feeder rods $F_1$, $F_2$. Any known marking technique, such as laser marking, ink jet printing, may be used to make a mark a position P. Even embossing may be used if the body material is thick enough to prevent the embossed marks showing through on the top side of tokens that are to be used for gaming.

In FIG. 6, after marking of the moulded tokens each token is transported by movement of the rods to a parting station, at which a cropping tool, comprising a punch indicated at C, C2 and a die (not shown), parts a token from the feeder rods.

The token 16C is at the parting station and about to be parted from the feeder rods $F_1$, $F_2$ by the punch (not shown) which act on the dashed lines $C_1$, $C_2$. Ideally the parted token is then pushed into engagement with a metal lever waiting to receive it and then the metal of the ring pull 5 is clinched onto the rib 19 to retain the token.

FIG. 8 shows a filled can of beverage at an early stage of opening. The pull ring has been lifted to a position at which its nose 15 has not moved enough to break the score 13. In spite of finger pressure, it will be seen that the token remains attached to the ring pull 5 and cannot be removed without further lever motion that would break the openable portion 14 free from the central panel 12.

FIG. 9 shows the same can as FIG. 8, but at the fully open position at which the token 16 can be conveniently gripped and pulled free from the lever 3.

Figure 10:
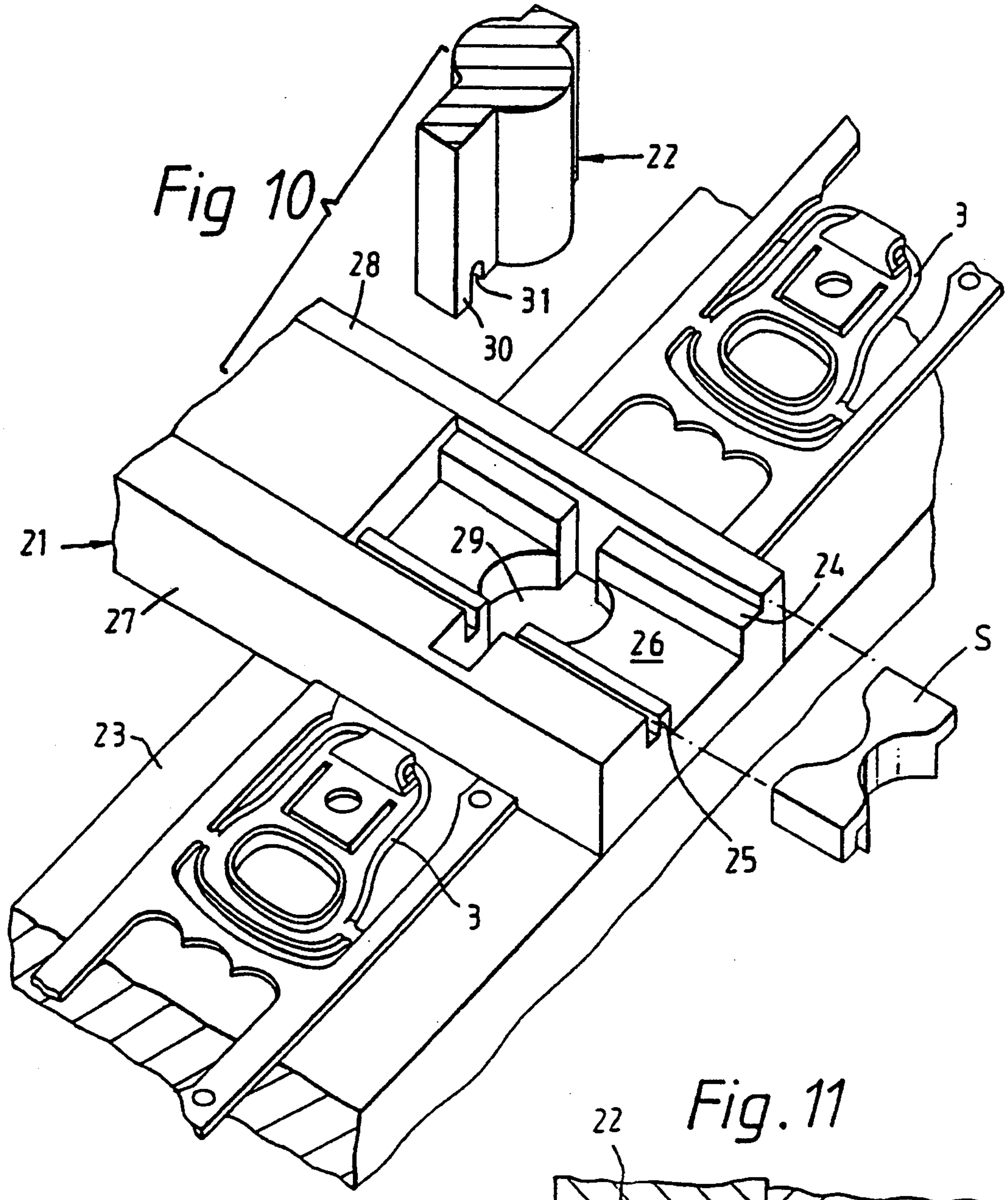
FIG. 10 is a perspective sketch of a combined cropping and fitting tool.
Figure 11:
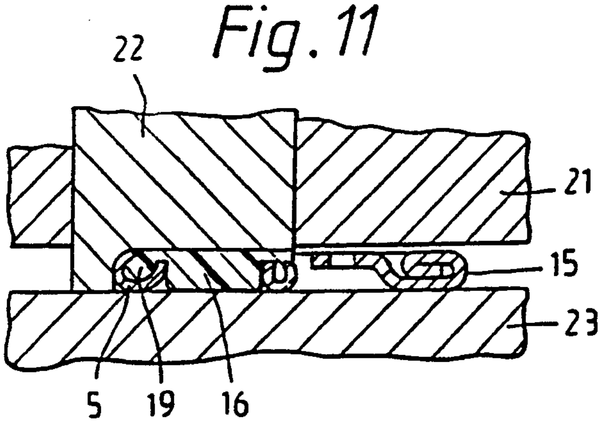
FIG. 11 is a side view of the cropping tool of FIG. 10 sectioned on the line of travel of the lever material.

FIGS. 10 and 11 show a tool for cutting an entire token from an alternative continuous extruded section, inserting the token into a part formed lever, and curling a peripheral portion of the lever to grip the first lug of the token.

The shape of the modified extruded section can be seen in the small piece of shred falling away from the tool. The cross section in FIG. 10 has a simple rectilinear rib at the edge of the extruded section instead of the bulb ended rib of FIG. 8 as is created by the clinching operation.

In FIG. 10 the tooling shown comprises a combined die plate and guides 21, a punch 22, and lower die block 23 of a progression tool used to form pull rings 3.

The die plate 21 comprises elongate members 24, 25 to support the material of the first and second lugs respectively while the token body material lies flat on the surface 26 in between. The die plate 21 further comprises elongate side members 27, 28 which serve to reinforce the plate against bending as it crosses the lever material.

The orifice 29 defines two sides of the token so that as the extruded section spans the orifice the peripheral surfaces of the token to be are confined on three sides by the orifice profiles and the elongate member 28.

The punch has a shape complimentary to that of the die orifice 29 and has an extension block 30 to its lower surface that defines a curl forming profile 31. As the punch is lowered to contact the extruded section the section is confined on all sides as cropping commences. The punch passes through the die orifice to push the token into engagement with a lever below.

FIG. 11 shows a token fitted in a lever and retained therein by a portion of the lever that has been curled over the first lug by a curling profile on the punch.

As the lever is passed along the die block 23 of its progression tool, the extruded section is moved to present further material for cropping and push the shred S off the die plate 21 for recycling.

FIGS. 12, 13, 14 and 15 show in detail a sequence press tool stations at which the ring pull is prepared to receive a token, a token is parted from a strip of tokens and fitted in the prepared ring pull, and then the token is retained in the ring pull by clinching peripheral metal of the ring pull onto a lug of the token.

FIG. 12 shows a tool station comprising an upper tool 35 and a lower tool 36. In FIG. 12*a* the ring pull component 37 is shown during curling of the ring pull metal to define a "finger" aperture 32. The ring pull component is supported on the lower tool block 36 which has a boss 39 which enters a recess in the ring pull between the nose 40 of the ring pull and the rivet receiving plate 41. This boss cooperates with a punch 42, of the upper tool, which has a curl forming profile 43, to centre the ring pull between the upper and lower tools 35, 36.

In FIG. 12*a* the curled ring pull component 37 is shown to have a curl 38 defining the "finger" aperture and a slot 44 at the right hand end of the ring pull, as drawn, defined by an upstanding peripheral portion 45 of the peripheral curl 46 of the pull ring.

FIG. 13 shows a tool station 47 comprising an upper tool 48 and a lower tool 49 for flattening the curl made by the tools of FIG. 12 so that a token may lie within the height of the ring pull. In FIG. 13*a* the ring pull component is supported on a lower tool which has a boss 50 extending between the nose 40 of the ring pull and the rivet receiving plate 41. The lower tool 49 also has a flat surface 51 which supports the ring portion of the pull ring and defines a recess 52 which is axially aligned with a plug member 52 of the upper tool 47. The plug member 53 of the upper tool is surrounded by a hollow punch 54 which cooperates with the lower tool to crush the curl 38 to a flatened curl 38 and push the upstanding peripheral portion to the required attitude to define the slot 44 to receive the lug of the token.

The required attitude of the slot defining portion is that of a "start curl" as can be seen in FIGS. 13*a* and 13*b*.

FIG. 14*a* shows a combined token parting and fitting station at which an upper tool 56, a lower tool 57 and a pressure plate 58 there between cooperate to part a token from a strip of token material (as shown in FIG. 14*b*) and fit the parted token into a prepared pull ring component (as shown in FIG. 14*c*).

In FIG. 14*a* an upper tool 56 comprises a tool holder 59 from which depends a pilot peg 60 which is used to register the upper tool with shred around the ring pull component (best seen in FIG. 10). A cutting punch 61 also depends from the tool holder for motion through the pressure plate 58 to push a parted token into a ring pull.

The pressure plate 58 comprises a plate portion 62 defining a first aperture 63 for the pilot peg 60 and a second aperture having a stepped bore 64 to support cutting die 65 with which the cutting punch cooperates to part a token from the strip. Top plates 66 define with the pressure plate portion a pair of marginal slots to guide the strip and prevent it bending during cutting.

The strip 68 of token material is a continuous extrudate having a central portion 69 flanked by offset flange or lug portions 70, 71 to each side of the central portion. I will be noticed that at the right hand side of the strip (as drawn) a further flange 72 portion is offset into the plane of the central or body portion of the strip.

The bottom tool 57 has a substantially flat top 73 surface to support a progression of ring pulls 3 in the shred 73 of metal from which they have been stamped (best understood from FIG. 10) in which pilot holes to receive the pilot peg are visible.

In FIG. 14*b* the upper tool has been lowered so that pressure plate 58 holds the pull rings, and their shred, flat, while the pilot peg 60 is engaged with a register hole, the ring pull shred 73 and the cutting punch 61 is about to cooperate with the die 65 to cut out a token from the strip and push it, via the position shown by dashed lines, through the die to a prepared ring pull 3 waiting to receive it, as is shown in FIG. 14*c*.

The ring pull component with token located in it is then transferred, by motion of the ring pull shred 73, to a further station shown in FIG. 15 at which the upstanding portion 45 of start curl material (created at the tool of FIG. 13) is curled into clinched engagement with the lug of the token. In FIG. 15 an upper tool 74 has a punch 75 provided with an end profile sloped to crush the upstanding portion 45 on the right hand lug while holding left hand lug in a crushed recess 77 (best seen in FIG. 13*b*) so that the token is held flat in the ring pull.

The completed ring pull with token attached is passed to a tool station (not shown) at which the ring pull is fixed, by a rivet of a can end, to the centre panel of a can end in a manner well known.

The crimping of a peripheral portion of the ring pull onto a localised lug of the token has been described because it is believed that, on opening of a can fitted with these ring pulls, removal of a lug will be easier than removal of a completely clinched periphery of a token with no lugs. However, careful clinching could provide a viable arrangement if desired.

FIGS. 16, 17 and 18 show an alternative token 80 which has three lugs 81, 82 83 offset from the plane of a plug portion 84 of the token. A first lug is clinched in the manner already described. The two further lugs defined by the terminal portions of the other lateral flange are clinched at the respective sides of the ring pull.

FIG. 19 shows an alternative form of token 85 cut from flat strip to have three lugs 86, 87, 88, in the same plane as a body 89, which are clinched in the same manner as the lugs of the token shown in FIGS. 16, 17 and 18. Whilst the token of FIG. 19 is easy to make it may be more difficult to remove unless the centre of the token is dished upwards to make its top surface accessible for finger pressure applied at the finger opening of the ring pull. If the strip from which the token is cut is amenable to cold forming, e.g. laminates of metal/-polymer, or acrylonitrile butadiene strip, or like thermoplastics, the strip material may be stretch formed in before cutting and fitting in the ring pull to provide a useful raised centre.

The token, as described above, is formed from an extruded section of polypropylene but other polymers may be used such as polyethylene or polyvinyl chloride. For gaming tokens it is preferable that the polymer be pigmented to prevent any risk of reading indicia through the token material.

The token typically weighs about 0.15 gm and the recyclable shred as little as 0.06 gm per token made so that this invention provides a token at an acceptable cost.

Whilst the lugs, described with reference to embodiments depicted, are substantially rectilinear, it is within the scope of this invention to use lugs of arcuate outline to fit the contours of the metal lever or ring pull chosen.

It will be understood that this invention may be applied to any container having a token fixed in the manner described.

We claim:

1. Apparatus for retaining a token on a lever or ring pull said apparatus comprising:

(a) means to feed a strip of material including token portions to a parting station;

(b) a parting station at which the token portion is severed from the strip of material;

(c) means to transfer the parted token to a location in a partly formed lever or ring pull; and (d) means to clinch a peripheral portion of the lever into clinched engagement with a peripheral portion of the token.

2. Apparatus according to claim 1 wherein the means to part the token portion from the strip is a punch and die so arranged that after parting the token from the strip the punch pushes the token through die and into engagement with the partly formed lever or ring pull.

3. Apparatus according to claim 1 wherein the apparatus further comprises means to convey the lever or ring pull with token attached to a station at which the pull ring is rivetted to a can end.

4. Apparatus for retaining a token on a lever or ring pull, said apparatus comprising:

(a) a parting station at which a token portion is severed from a strip of material; and (b) means for clenching a peripheral portion of the lever into clenched engagement with a peripheral portion of the token.

* * * * *